United States Patent [19]

Bockmann

[11] 3,715,283
[45] Feb. 6, 1973

[54] PROCESS FOR DISTILLING BENZYL CHLORIDE OR MIXTURES CONTAINING BENZYL CHLORIDE

[75] Inventor: Walter Bockmann, Krefeld-Uerdingen, Germany

[73] Assignee: Bayer Aktiengesellschaft, Leverkusen, Germany

[22] Filed: Dec. 22, 1970

[21] Appl. No.: 100,847

[52] U.S. Cl. ....................... 203/6, 203/58, 260/651
[51] Int. Cl. ......................... B01d 3/34, C07c 25/14
[58] Field of Search ............... 203/6, 7, 58; 260/651

[56] References Cited

UNITED STATES PATENTS

| 2,493,427 | 1/1950 | Thomas | 260/651 R |
| 2,542,216 | 2/1951 | Somogyi | 260/651 R |
| 2,542,225 | 2/1951 | West | 260/651 R |
| 2,803,674 | 8/1957 | Herberger et al. | 260/651 R |
| 3,535,391 | 10/1970 | Kyker | 260/651 R |

Primary Examiner—Wilbur L. Bascomb, Jr.
Attorney—Connolly and Hutz

[57] ABSTRACT

The invention relates to an improved process for distilling benzyl chloride or mixtures containing benzyl chloride, which is carried out in the presence of a lactam, appropriately in an amount of between about 0.01 and about 1 percent by weight.

5 Claims, No Drawings

PROCESS FOR DISTILLING BENZYL CHLORIDE OR MIXTURES CONTAINING BENZYL CHLORIDE

The invention relates to an improved process for distilling benzyl chloride or mixtures containing benzyl chloride.

It is known that benzyl chloride splits off hydrogen chloride relatively easily, especially at high temperatures, to form valueless, in most cases deeply colored, condensation products. Even traces of metals and of their compounds, especially iron oxides and iron salts, which can never be entirely avoided in industry without great effort, greatly promote this decomposition.

The decomposition of benzyl chloride manifests itself particularly unpleasantly when distilling benzyl chloride or mixtures containing benzyl chloride, for example mixtures with benzal chloride and benzotrichloride, such as arise in the industrial manufacture of benzyl chloride, since the distillation columns clog already within a relatively short time, through deposition of the condensation products, and undistillable residues become enriched in the sump.

It has been found that the decomposition of benzyl chloride and the disadvantages on distillation which are connected therewith are largely avoided by adding a lactam.

Accordingly, the invention consists in the distillation, in the presence of a lactam, of benzyl chloride or of a mixture containing benzyl chloride.

The lactam is appropriately present in an amount of between about 0.01 and about 1.0 per cent by weight, referred to the weight of benzyl chloride or mixture containing benzyl chloride to be distilled.

Suitable lactams are, for example, pyrrolidone-(2), ε-caprolactam, capryllactam and ω-lauryllactam.

The stabilizing effect of the addition of lactams is shown by the following test:

1 per cent by weight of sublimed iron-(III) chloride and 0.1, 0.5 and 1.0 per cent by weight of various lactams were added to pure benzyl chloride. The degree of decomposition of the benzyl chloride in weight per cent after 90 minutes, as measured from the amount of hydrogen chloride split off, was then determined at room temperature, at 50° C and at 95° C, as is shown by the Table below:

| Additive | % | Degree of decomposition of the benzyl chloride in % at Room temp. | 50°C | 95°C |
|---|---|---|---|---|
| None | — | 96 | not determined | not determined |
| Pyrrolidone-(2) | 0.1 | 10 | 91 | 96 |
| | 0.5 | 8 | 15 | 66 |
| | 1.0 | 10 | 12 | 13 |
| Caprolactam | 0.1 | 94 | not determined | not determined |
| | 0.5 | 13 | 35 | 88 |
| | 1.0 | 13 | 21 | 16 |
| Capryllactam | 0.1 | 87 | 95 | not determined |
| | 0.5 | 8 | 70 | 75 |
| | 1.0 | 8 | 14 | 17 |
| Lauryllactam | 0.1 | 72 | 94 | not determined |
| | 0.5 | 22 | 94 | not determined |
| | 1.0 | 10 | 17 | 30 |

On distilling benzyl chloride from an industrial mixture of toluene, benzyl chloride, benzal chloride and benzotrichloride, a decomposition which is only barely still measurable occurs in the presence of merely about 0.01 to about 0.05 per cent by weight of caprolactam, since the starting material only contains traces of metal compounds which cause decomposition, in contrast to the above tests, which were carried out with a comparatively very high iron chloride content.

Since the boiling point of the lactams is very much higher than that of the toluene chlorination products, it is practically impossible to distil portions of lactam at the same time. This avoids the desired decomposition-inhibiting action during the distillation becoming an undesired reaction-inhibiting action during the further use of the benzyl chloride.

What we claim is:

1. In the process of recovering benzyl chloride as overhead from a mixture containing benzyl chloride and a metal compound impurity by distillation, the improvement which comprises carrying out said distillation in the presence of from about 0.01 to about 1.0% by weight, based on the weight of the mixture of a lactam selected from the group consisting of pyrrolidone-(2), ε-caprolactam, capryllactam and ω-lauryllactam.

2. The improved process of claim 1 wherein said metal compound is ferric chloride.

3. The improved process of claim 1 wherein said mixture comprises benzyl chloride, benzal chloride, benzotri-chloride and said metal compound impurity.

4. A mixture comprising benzyl chloride and from 0.1 to 1.00/0 by weight of a lactam selected from the group consisting of pyrrolidone-(2), ε-caprolactam, capryllactam and ω-lauryllactam.

5. A process for inhibiting the decomposition of benzyl chloride which comprises adding to said benzyl chloride 0.1 to 1.00/0 by weight of a lactam selected from the group consisting of pyrrolidone-(2), ε-caprolactam, capryllactam and ω-lauryllactam.

* * * * *